(12) United States Patent
Odle et al.

(10) Patent No.: US 11,499,011 B2
(45) Date of Patent: Nov. 15, 2022

(54) POLYETHERIMIDE FROM METAL FREE IONOMERS

(71) Applicant: SABIC GLOBAL TECHNOLOGIES B.V., Bergen op Zoom (NL)

(72) Inventors: Roy Ray Odle, Mt. Vernon, IN (US); Ke Cao, Blacksburg, VA (US); Guoliang Liu, Blacksburg, VA (US); Timothy Edward Long, Blacksburg, VA (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 364 days.

(21) Appl. No.: 16/730,674

(22) Filed: Dec. 30, 2019

(65) Prior Publication Data
US 2020/0207916 A1 Jul. 2, 2020

(30) Foreign Application Priority Data
Dec. 31, 2018 (EP) .................................. 18215998

(51) Int. Cl.
*C08G 73/10* (2006.01)
*C08L 79/08* (2006.01)

(52) U.S. Cl.
CPC ....... *C08G 73/1071* (2013.01); *C08G 73/101* (2013.01); *C08L 79/08* (2013.01)

(58) Field of Classification Search
None
See application file for complete search history.

(56) References Cited

U.S. PATENT DOCUMENTS

| 4,588,805 A | 5/1986 | Williams, Jr. |
| 8,158,243 B2 | 4/2012 | Chan et al. |

(Continued)

FOREIGN PATENT DOCUMENTS

CN 105254888 A 1/2016

OTHER PUBLICATIONS

European Search Report for European Application No. 18215998.8 dated Jul. 8, 2019, 6 pages.

(Continued)

*Primary Examiner* — Rachel Kahn
(74) *Attorney, Agent, or Firm* — Cantor Colburn LLP

(57) ABSTRACT

A polyimide oligomer of formula (1a), (1b), a copolymer thereof, or a combination thereof (1a)

(1b)

(Continued)

-continued

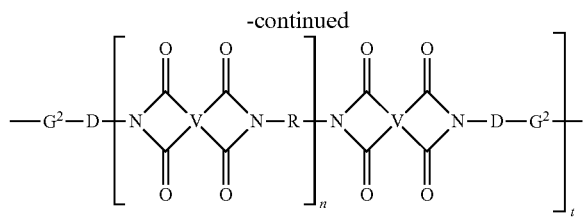

wherein each $G^1$ is independently the same or different, and is a cation group; each $G^2$ is independently the same or different, and is an anion group; each D is independently the same or different, and is a single bond or $C_{1-20}$ divalent hydrocarbon group; each V is independently the same or different, and is a tetravalent $C_{4-40}$ hydrocarbon group; each R is independently the same or different, and is a $C_{1-20}$ divalent hydrocarbon group; each n is independently the same or different, and is 1 to 1000, provided that the total of all values of n is greater than 4; and t is 2 to 1000.

17 Claims, 2 Drawing Sheets

(56) References Cited

U.S. PATENT DOCUMENTS

| | | | |
|---|---|---|---|
| 2008/0004391 A1 | 1/2008 | Chan et al. | |
| 2010/0055232 A1* | 3/2010 | Mathisen | A23G 4/06 |
| | | | 426/6 |
| 2016/0266420 A1* | 9/2016 | Lee | G02F 1/133711 |
| 2019/0315963 A1 | 10/2019 | Odle et al. | |

OTHER PUBLICATIONS

European Search Report for European Application 19219833.1 dated May 4, 2020, 6 pages.

Underwriter's Laboratory Bulletin 94, "Tests for Flammability of Plastic Materials for Parts in Devices and Appliances" (ISBN 0-7629-0082-2), Fifth Edition, Dated Oct. 29, 1996, incorporating revisions through and including Dec. 12, 2003; 52 pages.

* cited by examiner

POLYETHERIMIDE FROM METAL FREE IONOMERS

PRIORITY CLAIM

This application claims the benefit of and priority to European Patent Application No. 18215998.8, filed on 31 Dec. 2019, the entire content of which is incorporated herein by reference.

BACKGROUND

Polyimides (PIs), and in particular polyetherimides (PEIs), are amorphous, transparent, high performance polymers having a high glass transition temperature. Polyetherimides further have high strength, heat resistance, and modulus, and broad chemical resistance, and thus are widely used in applications as diverse as automotive, telecommunication, aerospace, electrical/electronics, transportation, and healthcare. Moreover, PEIs can be recycled, whereas some PIs are thermosets that cannot be recycled.

Accordingly, there remains a continuing need for thermoplastic polyimides and polyetherimides that have high thermal stability and superior mechanical properties.

SUMMARY

Provided is a polyimide oligomer of formula (1a), (1b), a copolymer thereof, or a combination thereof

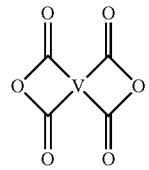

(5)

in a solvent and under conditions effective to provide an anhydride-capped oligomer; and reacting the anhydride-capped oligomer with amino compounds of formulas (6a) and (6b) $H_2N$-D-$G^1$-A and $H_2N$-D-$G^2$-M under conditions effective to provide the polyimide oligomer, wherein A is an anion, preferably $Cl^-$, $Br^-$, $I^-$, a substituted or unsubstituted ($C_{1-24}$ hydrocarbyl)carboxylate, $HCO_3^-$, $CO_3^{2-}$, $CH_3SO_4^-$, $HSO_4^-$, $SO_4^{2-}$, $H_2PO_4^-$, $HPO_4^{2-}$, $PO_4^{3-}$, $NO_3^-$, p-toluenesulfonate, bis(trifluoromethanesulfonyl)imide, or a combination thereof, more preferably $Cl^-$, $Br^-$, or $CO_3^{2-}$, M is a cation, preferably $Li^+$, $Na^+$, $K^+$, $Mg^{2+}$, $Ca^{2+}$, $Sr^{2+}$, $Zn^{2+}$, ammonium, phosphonium, imidazolium, guanidinium, pyridinium, or a combination thereof, more preferably $Li^+$, $Na^+$, or $K^+$, and R, V, D, $G^1$, and $G^2$ are as defined in any one or more the preceding claims.

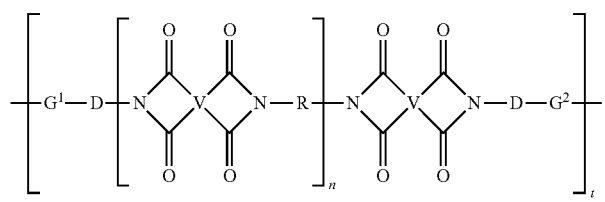

(1a)

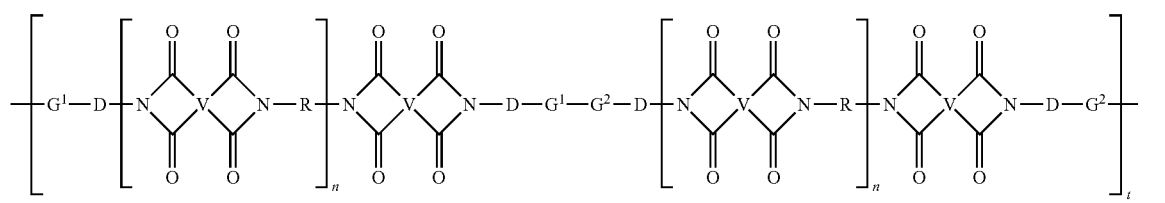

(1b)

wherein each $G^1$ is independently the same or different, and is a cation group; each $G^2$ is independently the same or different, and is an anion group; each D is independently the same or different, and is a single bond or $C_{1-20}$ divalent hydrocarbon group; each V is independently the same or different, and is a tetravalent $C_{4-40}$ hydrocarbon group; each R is independently the same or different, and is a $C_{1-20}$ divalent hydrocarbon group; each n is independently the same or different, and is 1 to 1,000, preferably 2 to 500, more preferably 3 to 100, provided that the total of all values of n is greater than 4, or greater than 10, or greater than 20, or greater than 50, or greater than 100, or greater than 250; and t is 2 to 1000, more preferably 3 to 500, even more preferably 4 to 250.

Also provided is a method for the manufacture of the polyimide oligomer comprising reacting a diamine of formula (4) $H_2N$-R-$NH_2$ with a dianhydride of formula (5)

Another method provides for the manufacture of a polyetherimide oligomer by reacting a diamine of formula (4) with an anhydride of formula (7)

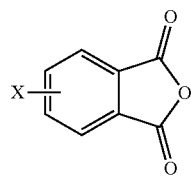

(7)

wherein X is a nitro group or halogen, to provide intermediate bis(phthalimide) of formula (8)

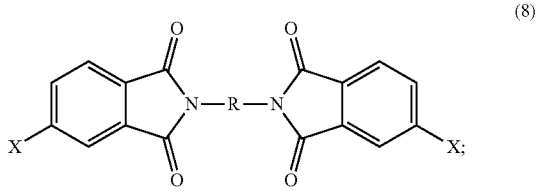

(8)

reacting the bis(phthalimide) with an alkali metal salt of a dihydroxy aromatic compound of formula (9) AMO—Z—OAM wherein AM is an alkali metal, to provide an anhydride-capped oligomer; and reacting the anhydride-capped oligomer with amino compounds of formulas (6a) and (6b).

Also provided is a polymer composition and an article, each comprising the polyimide oligomer.

The above described and other features are exemplified by the following figures, detailed description, and example.

BRIEF DESCRIPTION OF THE DRAWINGS

The following figures are exemplary aspects.

DETAILED DESCRIPTION

Figure 1:
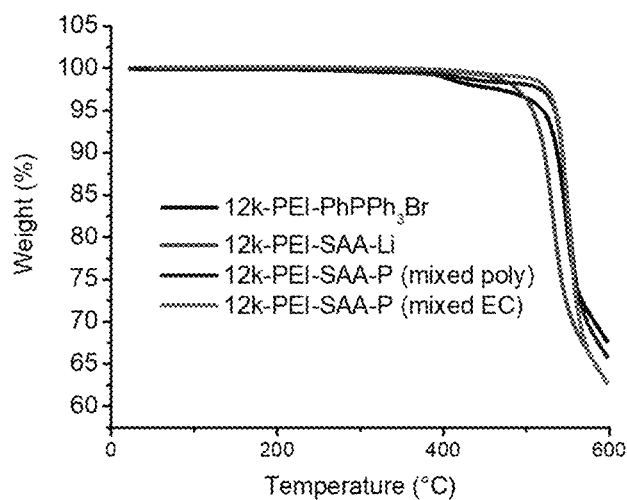
FIG. 1 is a graph weight percent (wt %) versus temperature (° C.) for polyetherimide (PEI) oligomers according to an aspect of the disclosure.

Mechanical strength, thermal stability, and flame retardancy are three desirable characteristics of polyimide (PI) and polyetherimide (PEI) for use in, for example, aviation and aerospace industries. Although high molecular weight PEIs inherently possess flame retardancy because of the high carbon content and high aromaticity, the flame retardancy of low molecular weight PEIs can be limited. To overcome these difficulties, the present inventors have discovered that simultaneous enhancement of the tensile strength, thermal stability, and flame retardancy is achieved by ionomeric polyimide oligomers. In particular, polyimide oligomers that are derived from telechelic polyimides having charged end groups, for example cationic end groups, anionic end groups, or a combination thereof.

Provided are polyimide oligomers end-linked through terminal cation-anion interactions, which can be prepared by polymerizing a dianhydride, a diamine, and optionally a branching polyamine, and subsequent endcapping of the intermediate product with a cationic or anionic amine compound. The resulting polyimides form linear and branched higher order oligomers through end caps that include cation groups such as phosphonium, ammonium, or the like, and anion groups such as carboxylate, sulfonate, or the like. The polyimide oligomers exhibit superior melt flow, thermal stability, mechanical properties, and flame retardancy.

The PI is a polyimide oligomer of formula (1a), (1b), a copolymer thereof, or a combination thereof:

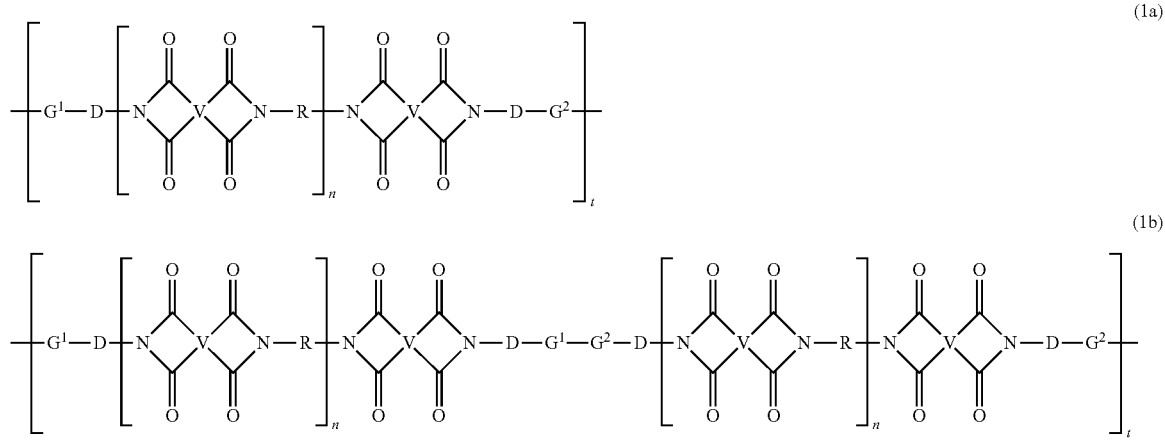

wherein each n is independently the same or different linear or branched repeat unit, and is 1 to 1,000, preferably 2 to 500, more preferably 3 to 100, provided that the total of all values of n is greater than 4, or greater than 10, or greater than 20, or greater than 50, or greater than 100, or greater than 250, for example 4 to 50 or 4 to 20. In formulas (1a) and (1b), t is 2 to 1000, more preferably 3 to 500, even more preferably 4 to 250, 4 to 50, or 4 to 20.

Each $G^1$ is independently the same or different, and is a cation group. For example, $G^1$ can be ammonium, phosphonium, sulfonium, imidazolium, guanidinium, or pyridinium. In particular, $G^1$ can be —N($R^a$)($R^b$)($R^c$)— or —P($R^a$)($R^b$)($R^c$)—, wherein $R^a$, $R^b$, and $R^c$ are each independently hydrogen, substituted or unsubstituted $C_{1-8}$ alkyl, or substituted or unsubstituted $C_{6-12}$ aryl. In some aspects, $R^a$, $R^b$, and $R^c$ are each independently $C_{1-3}$ alkyl optionally substituted with 1 to 8 halogen atoms or $C_{6-12}$ aryl optionally substituted with 1 to 6 $C_{1-8}$ alkyl groups, 1 to 8 halogen atoms, or a combination thereof.

Each $G^2$ is independently the same or different, and is an anion group. For example, $G^2$ can be carboxylate (—C(O)

O—), sulfate (—OS(O)$_2$O—), sulfonate (—S(O)$_2$O—), phosphate (—OP(O)(O$^d$)O—), phosphinate (—P(O)(R$^e$)O—), or phosphonate (—P(O)(OR$^f$)O— or —OP(O)(R$^g$)O—) wherein R$^d$, R$^3$, R$^f$, and R$^g$ are each independently hydrogen, substituted or unsubstituted C$_{1-8}$ alkyl, or substituted or unsubstituted C$_{6-12}$ aryl. In some aspects, R$^d$, R$^e$, R$^f$, and R$^g$ are each independently C$_{1-13}$ alkyl optionally substituted with 1 to 8 halogen atoms or C$_{6-12}$ aryl optionally substituted with 1 to 6 C$_{1-8}$ alkyl groups, 1 to 8 halogen atoms, or a combination thereof.

Each D is independently the same or different, and is a single bond or C$_{1-20}$ divalent hydrocarbon group. For example, D can be a substituted or unsubstituted C$_{1-20}$ alkylene, substituted or unsubstituted C$_{3-8}$ cycloalkylene, substituted or unsubstituted C$_{6-20}$ arylene, or substituted or unsubstituted C$_{3-12}$ heteroarylene, preferably C$_{1-20}$ alkylene or C$_{6-20}$ arylene. Exemplary D groups include methylene, m-phenylene, p-phenylene, bis(4,4'-phenylene)sulfone, bis(3,4'-phenylene)sulfone, or bis(3,3'-phenylene)sulfone.

Each V is independently the same or different, and is a tetravalent C$_{4-40}$ hydrocarbon group, such as a C$_{6-20}$ aromatic hydrocarbon group. Exemplary aromatic hydrocarbon groups include any of those of the formulas

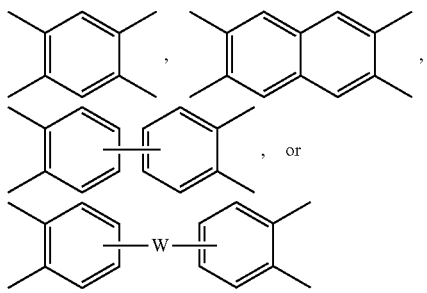

wherein W is —O—, —S—, —C(O)—, —SO$_2$—, —SO—, —P(R$^h$)(=O)— wherein R$^h$ is a C$_{1-8}$ alkyl or C$_{6-12}$ aryl, —C$_y$H$_{2y}$— wherein y is an integer from 1 to 5 or a halogenated derivative thereof (which includes perfluoroalkylene groups), or a group of the formula —O—Z—O— wherein Z is an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded.

Each R is independently the same or different, and is a C$_{1-20}$ divalent hydrocarbon group. For example, each R is the same or different C$_{6-20}$ aromatic hydrocarbon group or a halogenated derivative thereof, a straight or branched chain C$_{2-20}$ alkylene group or a halogenated derivative thereof, a C$_{3-8}$ cycloalkylene group or halogenated derivative thereof, in particular a divalent group of any of the formulas

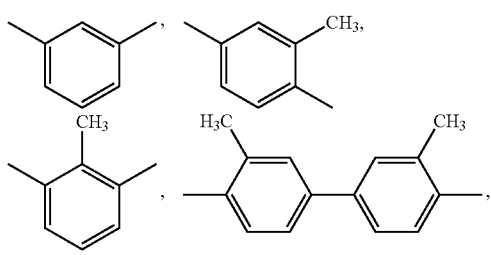

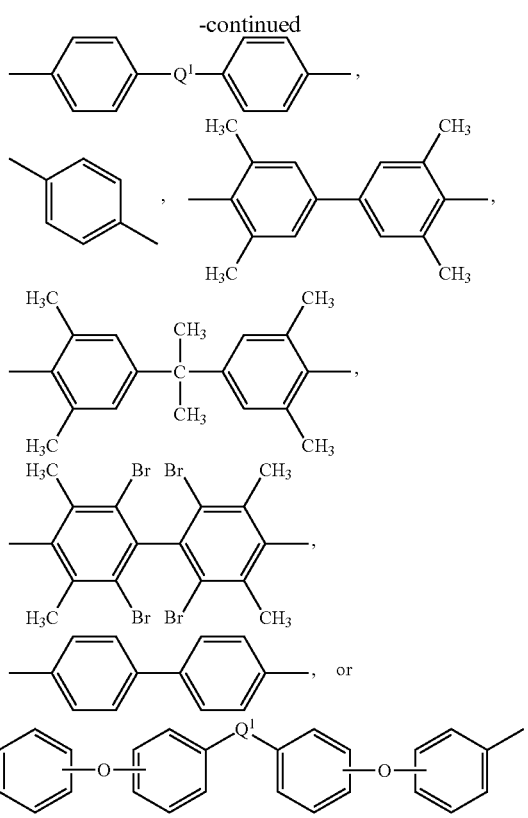

wherein Q$^1$ is —O—, —S—, —C(O)—, —SO$_2$—, —SO—, —P(R$^k$)(=O)— wherein R$^k$ is a C$_{1-8}$ alkyl or C$_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In a particular aspect, R is m-phenylene, p-phenylene, or a diarylene sulfone.

For convenience, the ionic bonding between cationic group G$^1$ and anionic group G$^2$ is an ionic bond that is depicted as -G$^1$-G$^2$-. It is understood that this expression is equivalent to G$^1$ and G$^2$ each having a formal charge, as in -(G$^1$)$^+$-(G$^2$)-. Similarly, for example when G$^1$ is —P(R$^a$)(R$^b$)(R$^c$)—, it is understood that —P(R$^a$)(R$^b$)(R$^c$)— is a cationic group having a +1 charge. In addition, for example when G$^2$ is —S(O)$_2$O—, it is understood that —S(O)$_2$O— is an anionic group having a −1 charge. Accordingly, in an exemplary polyimide oligomer wherein G$^1$ is —P(R$^a$)(R$^b$)(R$^c$)— and G$^2$ is —S(O)$_2$O—, the bond -G$^1$-G$^2$- is an ionic bond and can be represented as —P(R$^a$)(R$^b$)(R$^c$)—O(O)$_2$S—, which is equivalent to the cation-anion complex —[P(R$^a$)(R$^b$)(R$^c$)]$^+$—[O(O)$_2$S]—.

The polyimide oligomer of formula (1a) or (1b) can be a polyetherimide, wherein the structural units of formula (2)

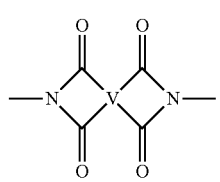

(2)

are divalent groups of formula (3)

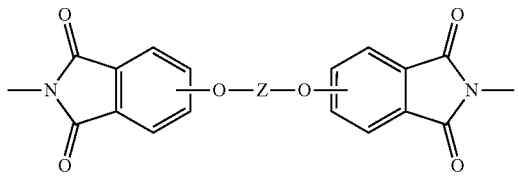

wherein the group Z in —O—Z—O— is a divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. The divalent bonds of the —O—Z—O— group are in the 3,3', 3,4', 4,3', or the 4,4' positions. Exemplary groups Z include groups derived from a dihydroxy compound of formula (3)

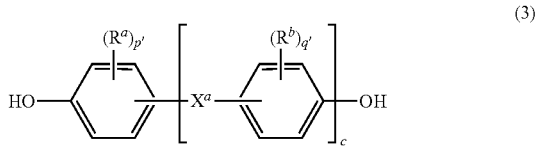

wherein $R^a$ and $R^b$ can be the same or different and are a halogen atom or a monovalent $C_{1-6}$ alkyl group, for example; p' and q' are each independently integers of 0 to 4; c is 0 to 4; and Xa is a bridging group connecting the hydroxy-substituted aromatic groups, where the bridging group and the hydroxy substituent of each $C_6$ arylene group are disposed ortho, meta, or para (preferably para) to each other on the $C_6$ arylene group. The bridging group Xa can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (3a)

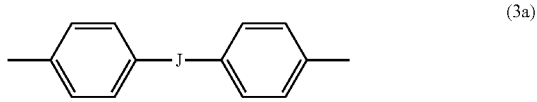

wherein J is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific aspect, Z is a derived from bisphenol A, such that J in formula (3a) is 2,2-isopropylidene. Alternatively, the polyimide can be a polyetherimide copolymer that optionally comprises additional structural imide units, for example imide units wherein V is of the formulas

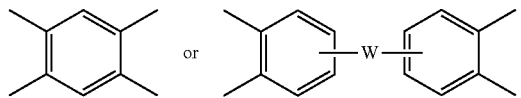

wherein W is a single bond, —O—, —S—, —C(O)—, —SO$_2$—, —SO—, —P(R$^j$)(=O)— wherein R$^j$ is a $C_{1-8}$ alkyl or $C_{6-12}$ aryl, or —C$_y$H$_{2y}$— wherein y is an integer from 1 to 5 or a halogenated derivative thereof (which includes perfluoroalkylene groups). These additional structural imide units can comprise less than 20 mol %, or 0 to 10 mol %, or 0 to 5 mol %, or 0 to 2 mol % of the total number of units. In some aspects, no additional imide units are present other than polyetherimide units when the polyimide is a polyetherimide.

The polyimide oligomers are prepared by methods known in the art, including a polycondensation or ether-forming polymerization.

The polyimide oligomer can be prepared by polycondensation, which includes an imidization of a dianhydride of formula (5) or formula (5a)

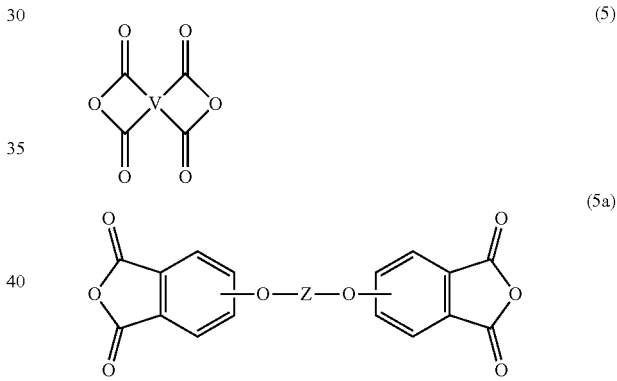

or a chemical equivalent thereof, with a diamine of formula (4)

in a solvent and under conditions effective to provide an anhydride-capped oligomer; and reacting the anhydride-capped oligomer with amino compounds of formulas (6a) and (6b)

under conditions effective to provide the polyimide oligomer. Group A is an anion, preferably Cl$^-$, Br$^-$, I$^-$, a substituted or unsubstituted ($C_{1-24}$ hydrocarbyl)carboxylate, HCO$_3^-$, CO$_3^{2-}$, CH$_3$SO$_4^-$, HSO$_4^-$, SO$_4^{2-}$, H$_2$PO$_4^-$, HPO$_4^{2-}$, PO$_4^{3-}$, NO$_3^-$, p-toluenesulfonate, bis(trifluoromethanesulfonyl)imide, or a combination thereof, more preferably Cl$^-$, Br$^-$, or CO$_3^{2-}$. Group M is a cation, preferably Li$^+$, Na$^+$, K$^+$, Mg$^{2+}$, Ca$^{2+}$, Sr$^{2+}$, Zn$^{2+}$, ammonium, phosphonium, imidazolium, guanidinium, pyridinium, or a combination thereof, more preferably Li$^+$, Na$^+$, or K$^+$.

Groups R, V, D, G¹, and G² are as defined herein. The method of forming the polyimide oligomer can further include an ion-exchange reaction to form salts of the formula $A_xM_y$, wherein x and y are integers that provide a charge-balanced salt. The salts can subsequently be separated during isolation and/or purification of the polyimide oligomer.

Alternatively, the polyimide oligomer of formula (1b) can be prepared using two separate polycondensation reactions, where the first reaction uses the amino compound of formula (6a) and the second reaction uses the amino compound of formula (6b). The resulting compounds are then combined to provide the polyimide oligomer of formula (1b).

Exemplary dianhydrides of formulas (5) and (5a) include 3,3-bis[4-(3,4-dicarboxyphenoxy)phenyl] propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4-dicarboxyphenoxy)diphenyl sulfone dianhydride, or a combination thereof.

Specific examples of diamines of formula (4) include hexamethylenediamine, polymethylated 1,6-n-hexanediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone (also known as 4,4'-diaminodiphenyl sulfone (DDS)), bis(4-aminophenyl) ether, or a combination thereof. Any regioisomer of the foregoing compounds can be used. For example, the diamine can be m-phenylenediamine, p-phenylenediamine, 4,4'-diaminodiphenyl sulfone, or a combination thereof.

The reaction mixture can optionally include 0.1 to 20 mol %, or 0.5 to 10 mol %, or 1 to 5 mol % of a branching polyamine (4a) of the formula

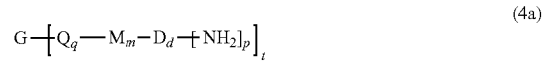

(4a)

based on the total moles of diamine (4) and polyamine (4a). In formula (4a), G is a group having a valence of t, each Q is independently the same or different, and is a substituted or unsubstituted divalent $C_{1-60}$ hydrocarbon group, —O—, —C(O)O—, —OC(O)O—, —S—, —S(O₃)—, —OS(O)₃—, or —OP(O)₃—, each M is independently the same or different, and is a substituted or unsubstituted divalent $C_{1-60}$ hydrocarbon group, —O—, —C(O)—, —OC(O)—, —OC(O)O—, —NHC(O), —(O)CNH—, —S—, —S(O)—, or —S(O)₂—, each D is independently the same or different, and is a single bond or $C_{1-20}$ divalent hydrocarbon group, each R is independently the same or different, and is a $C_{1-30}$ divalent bridging group, q is 0 or 1, m is 0 or 1, d is 0 or 1, p is 1 or 2, and t is 3 to 6. Use of the branching polyamine (4a) provides branched polyimide oligomer product(s). When G is a branching group, the polyimide can include from 0.01 to 20 mole percent (mol %), or 0.1 to 20 mol %, or 0.5 to 10 mol %, or 1.0 to 5 mol %, or 1.5 to 4 mol % of branching G end groups, based on the total moles of repeating units in the oligomer. More specifically, the polyimide can include from 0.01 to 20 of diimide units containing branching G end groups, based on the total moles of repeating diimide units in the polyimide oligomer.

A catalyst can be present during imidization. Exemplary catalysts include sodium aryl phosphinates, guanidinium salts, pyridinium salts, imidazolium salts, tetra($C_{7-24}$ arylalkylene) ammonium salts, dialkyl heterocycloaliphatic ammonium salts, bis-alkyl quaternary ammonium salts, ($C_{7-24}$ arylalkylene)($C_{1-16}$ alkyl) phosphonium salts, ($C_{6-24}$ aryl)($C_{1-16}$ alkyl) phosphonium salts, phosphazenium salts, and combinations thereof. The anion can be, for example, chloride, bromide, iodide, sulfate, phosphate, acetate, maculate, tosylate, or the like, or a combination thereof. The amount of catalyst can be, for example, 0.01 to 5 mol % percent, or 0.05 to 2 mol %, or 0.2 to 1 mol %, based on the moles of diamine (4).

The polyimides and polyetherimides can be prepared by polymerization in a solvent, for example relatively nonpolar solvents with a boiling point above 100° C., or above 150° C., for example o-dichlorobenzene, dichlorotoluene, 1,2,4-trichlorobenzene, dimethylacetamide, diphenyl sulfone, anisole, veratrole, diphenylether, N-methylpyrrolidone, or phenetole. The polymerization can be at a temperature of at least 110° C., or 150 to 275° C., or 175 to 225° C. for solution polymerization. Atmospheric or super-atmospheric pressures can be used, for example up to 500 kPa, to minimize solvent loss. Reaction time varies by reactants and conditions, and can be 0.5 hours (h) to 3 days, or 0.5 to 72 h, or 1 to 30 h, or 1 to 20 h; preferably in 20 h or less, more preferably 10 h or less, even more preferably 3 h or less.

The amino compounds (6a) and (6b) can be added to the reaction mixture (i.e., the reaction mixture containing the anhydride-capped oligomer), for example 1 to 24 h, or 1 to 20 h, or 1 to 18 h after the polymerization reaction begins. After addition of the amino compounds (6a) and (6b), the resulting mixture is subjected to continued heating, for example at 150 to 275° C., or 175 to 225° C., for an additional 1 to 10 h, or 1 to 5 h. After the step of continued heating, the reaction mixture can be subsequently heated at 200 to 450° C., or 300 to 400° C., for a period of 10 minutes (min) to 2 h, or 20 to 90 min, or 30 to 60 min.

The molar ratio of dianhydride (5) or (5a) to diamine (4) can be 0.9:1 to 1.1:1, or even 1:1. The amino compounds (6a) and (6b) can be added in an amount from 1 to 95 mol %, or 3 to 90 mol %, or 5 to 80 mol %, or 5 to 50 mol %, or 5 to 20 mol %, or 1 to 10 mol %, based on the total moles of dianhydride (5) or (5a).

An endcapping agent can be present during imidization or added after imidization to the resulting reaction mixture. If an amine-containing endcapping agent is used, the amount can be more than 0 to 10 mol % based on the total amount of dianhydride (5) or (5a). If an anhydride-containing endcapping agent is used, the amount can be in the range of more than 0 to 20 mol %, or 1 to 10 mol % based on the amount of the diamine (4). The endcapping agent can be added at any time. For example, the endcapping agents can be mixed with or dissolved into reactants having similar functionality, such as combining an anhydride-containing endcapping agent with dianhydride (5) or (5a). Where an anhydride-containing endcapping agent is used, in order to achieve maximum molecular weight, the quantity of amine functionality [2×diamine moles]=moles of anhydride functionality ([2×dianhydride moles+moles of anhydride in the endcapping agent]).

The polyimide oligomer can be a polyetherimide oligomer that is synthesized by an ether-forming polymerization, which proceeds via an imidization, i.e., reaction of a diamine of formula (4) with an anhydride of formula (7)

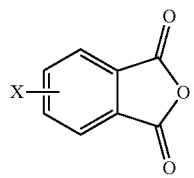
(7)

wherein X is a nitro group or halogen, to provide intermediate bis(phthalimide)s of formula (8)

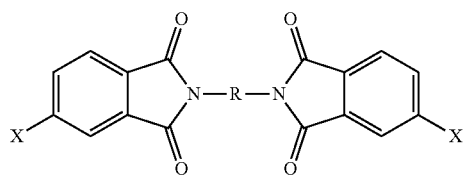
(8)

wherein R is as described in formula (4) and X is as described in formula (7). An optional catalyst or optional monofunctional chain terminating agent as described above can be present during imidization.

The bis(phthalimide) (8) is subsequently reacted with an alkali metal salt of a dihydroxy aromatic compound of formula (9)

AMO—Z—OAM (9)

wherein AM is an alkali metal and Z is as defined herein, to provide the anhydride-capped oligomer; and the anhydride-capped oligomer is reacted with the amino compounds (6a) and (6b) under conditions effective to provide the polyetherimide oligomer. Polymerization conditions effective to provide the polyetherimides are generally known, and can be conducted in a solvent as described above. This polymerization can also be conducted in the melt, for example at 250 to 350° C., where a solvent is generally not present.

In another aspect, a polyimide composition includes a first polyimide of formula (10), a precursor thereof, or a combination thereof; a second polyimide of formula (11), a precursor thereof, or a combination thereof; and optionally a third polyimide of formula (12), a precursor thereof, or a combination thereof

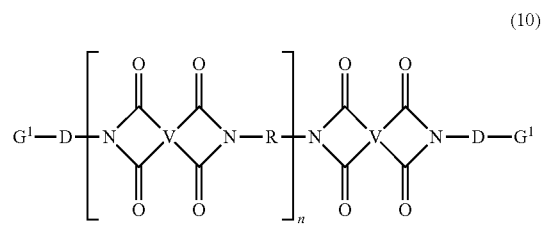
(10)

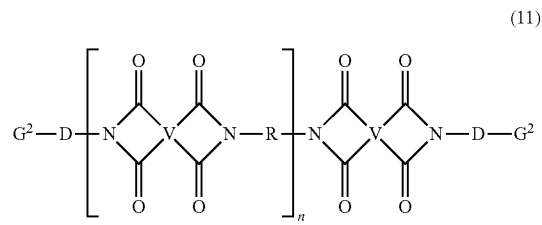
(11)

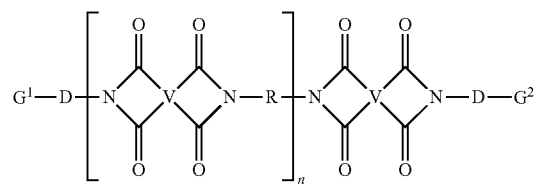
(12)

wherein each $G^1$ is independently the same or different, and is a cation group as provided herein; each $G^2$ is independently the same or different, and is an anion group as provided herein; each D, V, R, and n is independently the same or different, as provided herein.

The polyimides and/or precursors thereof of the polyimide composition can form the polyimide oligomers of formulas (1a), (1b), a copolymer thereof, or a combination thereof, by ion-exchange and self-assembly processes. For example, the polyimide composition can be subjected to appropriate conditions, such as heating and/or stirring, to provide the polyimide oligomers. The polyimide oligomer can be separated using a two-phase system having organic and aqueous phases, where salts such as LiBr or NaCl can be readily separated from the polyimide oligomers. Other methods can include dissolving the polyimide composition in an organic solvent followed by precipitation with an aqueous solvent system or water.

Exemplary first polyimides of formula (10) include, but are not limited to, the first polyimide of formula (10a)

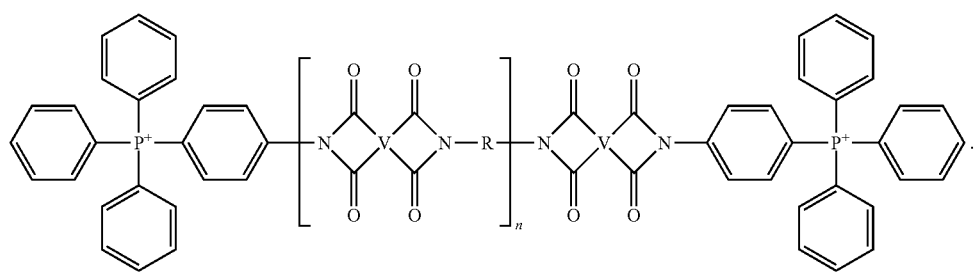

(10a)

Exemplary second polyimides of formula (11) include, but are not limited to, the second polyimide of formula (11a)

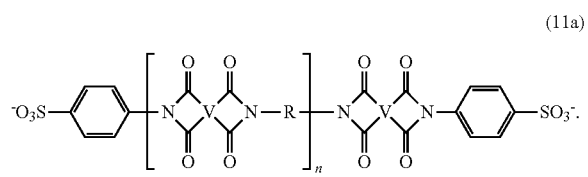

(11a)

Exemplary third polyimides of formula (12) include, but are not limited to, the third polyimide of formula (12a)

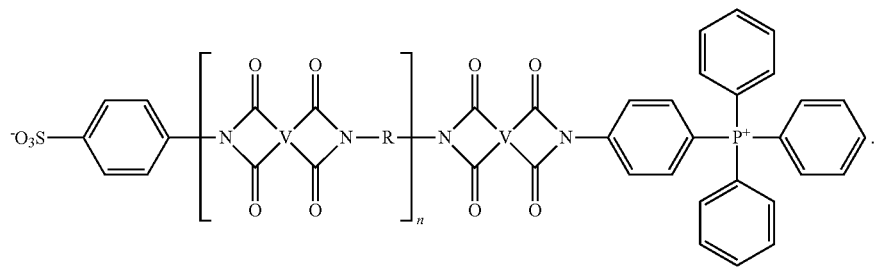

(12a)

The polyimide composition can be prepared by combining a first polyimide precursor, a second polyimide precursor, and optionally a third polyimide precursor under conditions effective to provide the polyimide composition. It is to be understood that the polyimide composition includes the first polyimide which is a bis-cationic compound (i.e., having a charge of +2), the first polyimide precursor which is a neutral compound, or a combination thereof. In addition, it is to be understood that the polyimide composition includes the second polyimide which is a bis-anionic compound (i.e., having a charge of −2), the second polyimide precursor which is a neutral compound, or a combination thereof. It is also to be understood that the polyimide composition optionally includes the third polyimide which is a zwitterionic compound, the third polyimide precursor which is a neutral compound, or a combination thereof. For convenience, the counter ions are not shown in (10a), (11a), or (12a).

The first polyimide precursor can be prepared by reacting the diamine of formula (4) with a dianhydride of formula (5) or (5a) under conditions effective to provide a first anhydride-capped oligomer; and reacting the first anhydride-capped oligomer with an amino compound of formula (13a)

$$H_2N\text{-}D\text{-}G^1\text{-}A \quad (13a)$$

under conditions effective to provide the first polyimide precursor. In formula (13a), A is an anion, preferably Cl, Br, I, carbonate, nitrate, phosphate, sulfate, or a combination thereof, more preferably Cl, Br, or carbonate, and R, V, D, and $G^1$ are as provided above.

The second polyimide precursor can be prepared by reacting the diamine of formula (4) with a dianhydride of formula (5) or (5a) under conditions effective to provide a second anhydride-capped oligomer; and reacting the second anhydride-capped oligomer with an amino compound of formula (13b)

$$H_2N\text{-}D\text{-}G^2\text{-}M \quad (13b)$$

under conditions effective to provide the second polyimide precursor. In formula (13b), M is a cation, preferably Li, Na, K, Mg, Ca, Sr, Zn, ammonium, phosphonium, imidazolium, guanidinium, pyridinium, or a combination thereof, more preferably Li, Na, or K, and R, V, D, and $G^2$ are as provided above.

The third polyimide precursor can be prepared by reacting the diamine of formula (4) with a dianhydride of formula (5) or (5a) under conditions effective to provide a third anhydride-capped oligomer; and reacting the third anhydride-capped oligomer with amino compounds of formulas (6a) and (6b) under conditions effective to provide the third polyimide precursor. The third polyimide precursor can further be prepared under suitable conditions to form a mixed end group compound.

Optionally, the polyimide composition can be subjected to appropriate conditions, such as heating and/or stirring, to drive an ion-exchange process and self-assembly. The resulting salts can be separated using a two-phase system having organic and aqueous phases, where salts such as LiBr or NaCl can be readily separated from the polyimide compounds. Other methods can include dissolving the polyimide composition in an organic solvent followed by precipitation with an aqueous solvent system or water The polyimide oligomer can have one or more of the following properties. The polyimide oligomer can have a glass transition temperature ($T_g$) of greater than 160° C., preferably 160 to 395° C., more preferably 180 to 280° C., even more preferably 200 to 250° C., as determined by differential scanning calorimetry (DSC); a viscosity of greater than 25,000 Pascal·seconds at a frequency of 0.1 radians per second; a polydispersity (PDI) of 1.5 to 3, preferably 1.8 to 3, more preferably 2 to 3, as determined by size exclusion chromatography multi-angle light scattering (SEC-MALS); a melt index of 0.1 to 10 grams per minute (g/min), as measured by ASTM D1238 at 340 to 370° C., using a 6.7 kilogram (kg) weight; a weight average molecular weight ($M_w$) of 1,000 to 150,000 grams per mole (g/mol), or 10,000 to 80,000 g/mol, or 20,000 to 60,000 g/mol, as measured by gel permeation chromatography (GPC), using polystyrene standards or light scattering; an intrinsic viscosity greater than 0.2 deciliters per gram (dL/g), or, more preferably, 0.35 to 0.7 dL/g, as measured in m-cresol at 25° C.; a thermal decomposition temperature of greater than 450° C., preferably 480 to 600° C., more preferably 500 to 600° C., as determined at a 5% weight loss by thermogravimetric analysis (TGA); a tensile strength of greater than 70 megapascals (MPa), or 70 to 160 MPa, preferably 80 to 140 MPa, more preferably 90 to 130 MPa, as determined by ASTM D638; an elongation at break of greater than 3%, or 3 to 6%, preferably 4 to 6%, more preferably 4.5 to 6%, as determined by ASTM D638; an elastic modulus of 2 to 5 gigapascal (GPa), preferably 2.3 to 3.8 GPa, more preferably 2.6 to 3.6 GPa, as determined by ASTM D882; a UL94 rating of V-1 or better, as measured following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003; a UL94 rating of V-0 or V-1 at a thickness of 0.3, 0.5, 0.75, 0.9, 1, 1.5, 2, or 3 mm; a char yield of greater that 50%, preferably greater than 55%, more preferably greater than 58%, as determined by thermogravimetric analysis in nitrogen at 980° C.

In another aspect, a polymer composition is provided. The polyimide oligomer or polyimide composition can be combined with a second polymer that is not the same as the polyimide oligomer or polyimides of the polyimide composition. Such polymer compositions can include 1 to 99 wt % of the polyimide oligomers and 1 to 99 wt % of the second polymer, or 10 to 90% of the polyimide oligomers and 10 to 90 wt % of the second polymer.

Illustrative examples of second polymers include, but are not limited to, a polyacetal, poly($C_{1-6}$ alkyl)acrylate, polyacrylamide, polyacrylonitrile, polyamide, polyamideimide, polyanhydride, polyarylene ether, polyarylene ether ketone, polyarylene ketone, polyarylene sulfide, polyarylene sulfone, polybenzothiazole, polybenzoxazole, polybenzimidazole, polycarbonate, polyester, poly($C_{1-6}$ alkyl)methacrylate, polymethacrylamide, cyclic olefin polymer, polyolefin, polyoxadiazole, polyoxymethylene, polyphthalide, polysilazane, polysiloxane, polystyrene, polysulfide, polysulfonamide, polysulfonate, polythioester, polytriazine, polyurea, polyurethane, vinyl polymer, or a combination thereof.

The polyimide composition or polymer composition can include various additives ordinarily incorporated into compositions of these types, with the proviso that any additive is selected so as to not significantly adversely affect the desired properties of the composition. Exemplary additives include antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame resistances, anti-drip agents, and radiation stabilizers. Particulate fillers and reinforcing fillers can also be present, and include mineral fillers, flaked fillers, carbon nanotubes, exfoliated nanoclays, carbon nanowires, carbon nanospheres, carbon-metal nanospheres, carbon nanorods, carbon-metal nanorods, nanoparticles, insoluble polymers, glass fibers, carbon fibers, glass-carbon fibers, talc including fibrous, modular, needle shaped, and lamellar talc, graphite, fibrillated fluoropolymers, polymer fibers and filaments, woven fibers, metal particles, inorganic fibers, single crystal fibers or "whiskers", or the like. Combinations of additives can be used. The foregoing additives can be present individually in an amount from 0.005 to 10 wt %, or combined in an amount from 0.005 to 20 wt %, preferably 0.01 to 10 wt %, based on the total weight of the composition.

Also provided herein is an article that includes the polyimide oligomer, polyimide composition, or polymer composition. A wide variety of articles can be manufactured, for example articles of utility in automotive, telecommunication, aerospace, electrical/electronics, battery manufacturing, wire coatings, transportation, food industry, and healthcare applications. Such articles can include films, fibers, foams, thin sheets, small parts, coatings, fibers, preforms, matrices for polymer composites, or the like. The article can be an open or closed cell foam, preferably a closed cell foam. The articles can be extruded or molded, for example injection molded. The articles can be made by an additive manufacturing method, for example three dimensional printing. Components for electronic devices and components for sterilizable medical articles are especially useful. Thin-wall components manufactured by injection molding are useful, such as a wall having a thickness from 0.1 to 10 mm, or 0.2 to 5 mm, or 0.5 to 2 mm. For example, a film can be manufactured by solution-casting or melt processing the polyimide oligomer, the polyimide composition, or the polymer composition.

The polyimide oligomers and compositions are further illustrated by the following non-limiting examples.

EXAMPLES

The components in Table 1 were used in the Examples. Unless specifically indicated otherwise, the amount of each component is in weight percent in the following examples, based on the total weight of the composition.

TABLE 1

| Component | Description |
| --- | --- |
| BPADA | 2,2-Bis[4-(3,4dicarboxyphenoxy) phenyl] propane dianhydride (SABIC) |
| mPD | m-Phenylenediamine (Sigma-Aldrich) |
| SAA-H | Sulfanilic acid, ≥99.0% (Sigma-Aldrich) |
| 4-Bromoaniline | 4-Bromoaniline (Sigma-Aldrich) |
| PPh$_3$ | Triphenylphosphine (Sigma-Aldrich) |
| Pd(OAc)$_2$ | Palladium (II) acetate (Sigma-Aldrich) |
| LiBr | Lithium bromide, ≥99.0% (Sigma-Aldrich) |
| K$_2$CO$_3$ | Potassium carbonate, ≥99.0% (Sigma-Aldrich) |
| PEI-1 | Linear polyetherimide, $M_n$ = 16.9 kg/mol as determined by dynamic light scattering (SABIC) |
| PEI-2 | Linear polyetherimide, $M_n$ = 24.5 kg/mol as determined by dynamic light scattering (SABIC) |

Physical testing of the compositions was conducted according to the following test methods and procedures.

Unless indicated otherwise, all test standards set forth herein are the test standards in effect as of 2016.

Nuclear magnetic resonance spectroscopy characterization was performed on a Varian Unity 400 at 399.98 MHz ($^1$H NMR) or 162 MHz ($^{31}$P NMR) using CDCl$_3$ or DMSO-d$_6$.

X-ray photoelectron spectroscopy (XPS) characterizations were performed on a PHI VersaProbe III scanning XPS microscope using monochromatic Al Kα X-ray (1486.6 eV) with a 100-μm beam diameter. All binding energies were calibrated according to the binding energy of the C 1s peak (284.8 eV).

Thermogravimetric analysis (TGA) was performed on a Discovery TGA 5500 (TA Instruments). The samples were heated to 1000° C. at a heating rate of 20° C./min in a stream of nitrogen (25 mL/min). This analysis was used to determine the temperature of peak decomposition (also referred as the onset decomposition temperature), and char yield at the end of TGA run (at 1,000° C. under nitrogen).

Differential scanning calorimetry (DSC) was performed on a Discovery DSC2500 (TA Instruments), which was calibrated using indium) and zinc standards. The samples were heated at a rate of 10° C./min in a stream of nitrogen (25 mL/min). Glass transition temperature (T$_g$) was determined at the midpoint of the transition in the second heating ramp. The polymers were hot-pressed between two Kapton sheets at 315° C. using two 0.254-mm-thick shims to control the film thickness. A mold releasing agent (provided by REXCO) was applied on the Kapton sheets to prevent the polymers from sticking. The polymer films were stepwise hot-pressed at a force of 1, 5, 7, 10, and 10 tons for one minute and released after each pressing (five pressing-releasing cycles in total).

Dynamic mechanical analysis (DMA) was performed in accordance with following procedure. The films samples (thickness=0.5 mm to 2 mm) were mounted on the grips and test was done under tensile mode at 1 Hz frequency and with 3° C./min ramp rate. The storage modulus was recorded as function of temperature.

Weight average molecular weight (M$_w$), number average molecular weight (M$_n$), and polydispersity (PDI) were measured by size exclusion chromatography (SEC, Eco-SECHLC-8320, Tosoh Bioscience) equipped with a Wyatt MiniDAWN TREOS multi-angle light scattering detector and a differential refractive index detector (DRI). The PEIs were dissolved in DMF, and the flow rate was 0.5 mL min$^{-1}$. The column set consisting of a SuperH-H guard column (4.6 mm ID×3.5 cm, 4 μm), a SuperH-H guard column (6.0 mm ID×15 cm, 4 μm), and two SuperH-H guard columns (6.0 mm ID×15 cm, 4 μm) carried out the separation. Both the detectors and columns were maintained at 50° C. Polystyrene standards were used as reference.

Tensile testing samples were prepared by melt-pressing samples between two Kapton sheets at 300° C. using two 0.1-inch-thick shims. A mold release agent (REXCO) was applied on the Kapton sheets to prevent the polymers from sticking. The polymer films were stepwise hot-pressed at a force of 1, 5, 7, 10, and 10 tons for one minute and released after each pressing (five press-release cycles in total). Tensile specimens were tested using Instron 3366 at 23° C. with a 2 kN load cell at a strain rate of 5 mm/min until failure. Yield strength (MPa), break strength (MPa), and yield strain (%) are measured according to ASTM D638.

Example 1: Synthesis of Ionomeric PEI Containing Phosphonium and Sulfonate Groups by Mixing Polymers (PEI-SAA-P (Mixed Poly))

Scheme 1 shows the synthesis of polyetherimide dianhydride (PEI-DA) and PEI-SAA-P (mixed poly).

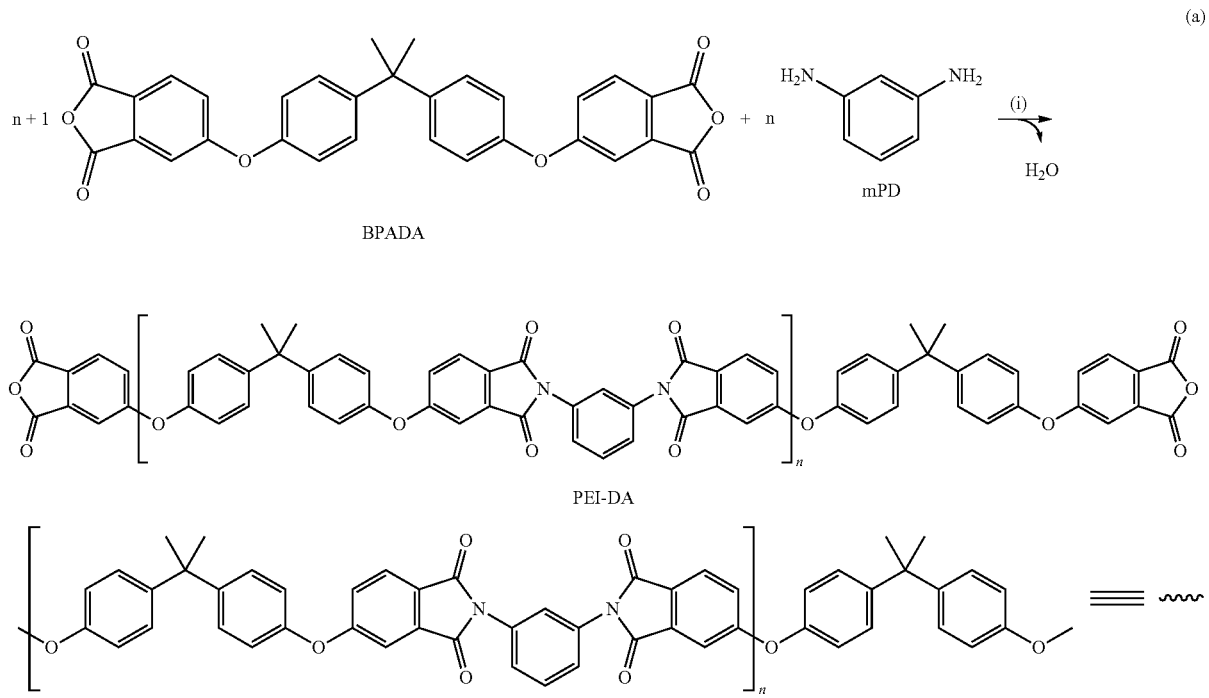

Scheme 1

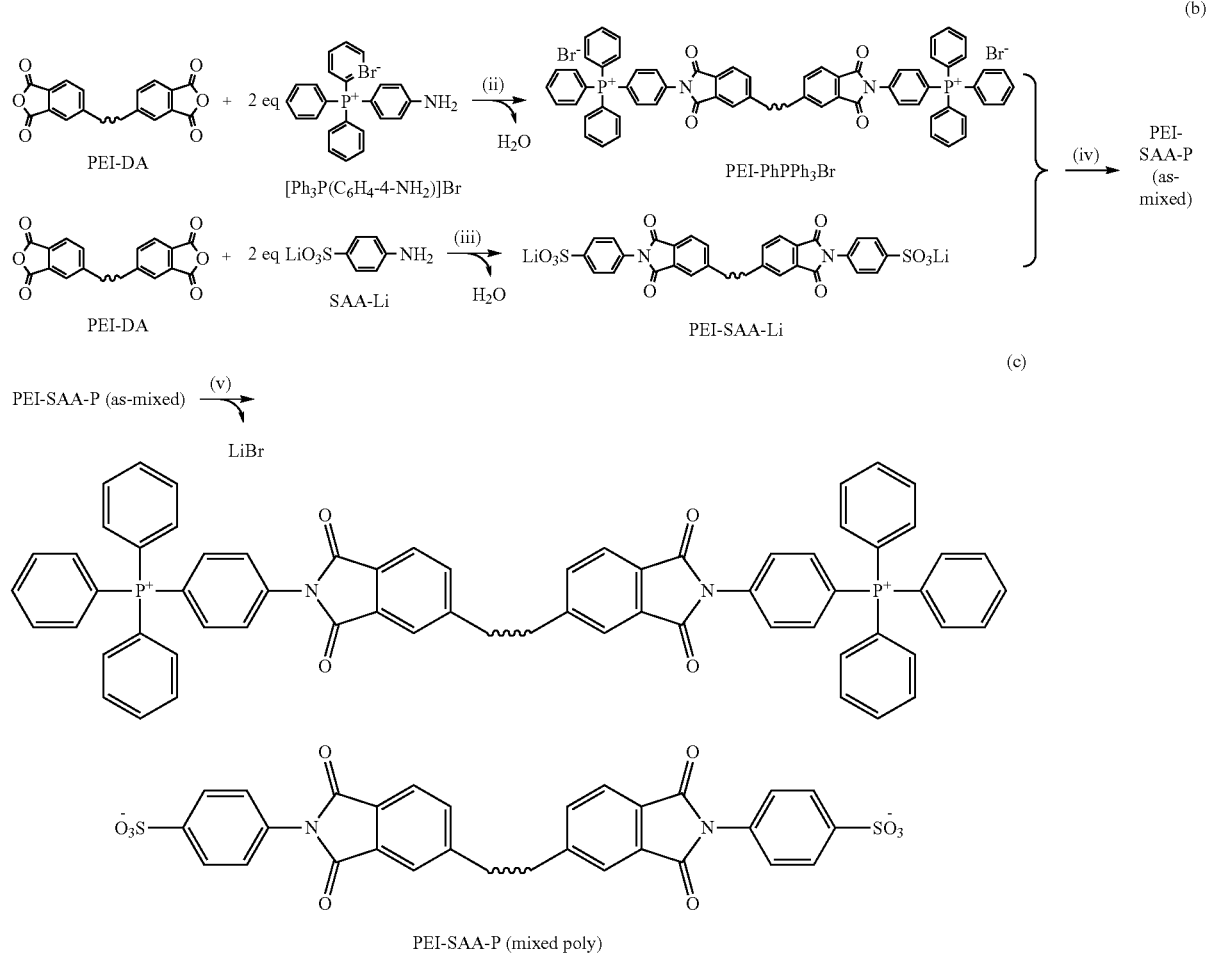

PEI-SAA-P (mixed poly)

In scheme 1, the following conditions were used: (i) oDCB, 180° C., 12 h; (ii) oDCB, 180° C., 12 h; 380° C., 0.5 h; (iii) NMP, 180° C., 6 h; 380° C., 0.5 h; and (v) dissolve in DMF, precipitate into MeOH.

Dianhydride-terminated PEI (PEI-DA) with a target number average molecular weight ($M_n$) of 8 kDa (8k-PEI-DA) is described as follows. A 500-mL three-neck round-bottom flask was equipped with an overhead stirring-rod, a Dean-Stark trap, and a nitrogen inlet. The flask was charged with BPADA (17.389 g, 33.409 mmol), mPD (3.335 g, 30.84 mmol), and oDCB (80 mL) and then purged with $N_2$. Subsequently, the slurry was heated at 180° C. for 12 h under constant stirring and then at 380° C. for 0.5 hours (h) without stirring. The entire reaction was conducted in a constant stream of nitrogen. A similar procedure, using the appropriate reaction conditions, was used to prepare PEI-DA with target $M_n$ of 10 kDa (10k-PEI-DA) and 12 kDa (12k-PEI-DA).

Phosphonium bromide terminated PEI (PEI-PhPPh$_3$Br) was prepared as follows. [Ph$_3$P(C$_6$H$_4$-4-NH$_2$)]Br (triphenyl-4-aminophenylphosphonium bromide) was prepared as shown in Scheme 2. PPh3 (2.649 g, 10.00 mmol), 4-bromoaniline (1.773 g, 10.00 mmol), and CH$_3$CN (10 mL) were charged to a 100-mL two-neck round-bottom flask with a stirring bar. Pd(OAc)$_2$ (0.023 g, 1.0 mmol) was added as the catalyst. The mixture was heated at reflux for 24 hours until a white precipitate started hindering the stirring. The precipitate was filtered and washed with acetone until the filter cake was completely white. The white powder was then collected and dried in vacuo at 100° C. to provide [Ph$_3$P(C$_6$H$_4$-4-NH$_2$)]Br in a 30% yield with a melting point of about 340° C. $^1$H NMR (400 MHz, CDCl$_3$, δ): 7.87-7.82 ppm (m, 3H, C$_6$H$_5$P—), 7.72-7.67 ppm (m, 6H, C$_6$H$_5$P—), 7.65-7.55 ppm (m, 6H, C$_6$H$_5$P—), 7.20-7.09 ppm (m, 4H, 4-NH$_2$C$_6$H$_4$P—). $^{31}$P NMR (162 MHz, CDCl$_3$, δ): 22.1 ppm.

PEI-PhPPh$_3$Br was then prepared by reacting PEI-DA with [Ph$_3$P(C$_6$H$_4$-4-NH$_2$)]Br (Scheme 1). For example, the synthesis of PEI-PhPPh$_3$Br with a targeted $M_n$ of 8 kDa (8k-PEI-PhPPh$_3$Br) is described as follows. [Ph$_3$P(C$_6$H$_4$-4-NH$_2$)]Br (2.448 g, 5.637 mmol) was added to the three-neck round-bottom flask that contained the as-synthesized 8k-PEI-DA. The flask was equipped with a mechanical stirrer, an $N_2$ inlet, and a Dean-Stark trap. The mixture was heated at 180° C. for 12 h under constant stirring. Afterwards the mixture was heated at 300° C. for 0.5 h without stirring. The reaction was conducted with a constant $N_2$ flow. After the reaction, the product was dissolved in CHCl$_3$ and precipitated into methanol (MeOH). The precipitate was filtered, washed with MeOH, and dried in vacuo at 180° C.

SAA-Li was prepared as follows. To a 100-mL two-neck round-bottom flask with a stirring bar, SAA-H (3.464 g, 20.00 mmol), LiBr (12.00 mmol), and deionized water (100 mL) were added and refluxed for 1 h. The product was then filtered using a filtering paper and the filtrate was placed under vacuum to remove the water. A white powder was collected and dried in vacuo at 100° C. $^1$H NMR (400 MHz, DMSO-d$_6$, δ): ~7.3-7.2 ppm (m, 2H, —C$_6$H$_4$SO$_2$—), ~6.48-6.41 ppm (m, 2H, —C$_6$H$_4$SO$_2$—), ~5.22-5.17 ppm (br s, 2H, —NH$_2$). The SAA-K salt was similarly prepare using SAA-H and K$_2$CO$_3$.

The 8k-PEI-SAA-Li oligomer was prepared as follows. To the flask containing the 8k-PEI-DA oligomer prepared as described above, SAA-Li (5.139 mmol) and NMP (60 mL) were added. The mixture was heated at 180° C. for 6 h under constant stirring and then at 300° C. for 0.5 h without stirring in a metal bath. The entire reaction was conducted under a constant stream of N$_2$. The product was dissolved in DMF and precipitated into acetone. The precipitate was filtered, washed sequentially with deionized water and acetone, and then dried in vacuo at 180° C. for at least 8 h.

The synthesis of 12k-PEI-SAA-P (mixed poly) is described as follows. To one-neck round-bottom flask with a magnetic stirring bar, PEI-PhPPh$_3$Br (8.29 g, 0.658 mmol) and PEI-SAA-Li (7.96 g, 0.658 mmol) powders were added and shaken. DMF (80 mL) was added and the resulting slurry was stirred at room temperature until the solids were fully dissolved. Afterwards, the solution was precipitated into MeOH. The precipitates were collected by filtration, washed by MeOH, and dried in vacuo at 180° C.

Similarly, 12k-PEI-SAA-P (mixed poly) was prepared using the potassium salt. 12k-PEI-PhPPh$_3$Br (1.66 g) and 12k-PEI-SAA-K (1.61 g) were mixed at 1:1 molar ratio in 20 mL dichloromethane. 20 mL of deionized water was added into the dichloromethane solution to form a slurry, and then precipitated into MeOH. The precipitate (12k-PEI-SAA-P(Ph$_3$)-PEI without KBr) was filtered, washed with deionized water and MeOH, and dried in vacuo at 180° C.

Example 2: Synthesis of Ionomeric PEI Containing Phosphonium and Sulfonate Groups by Mixing End Cappers (PEI-SAA-P (Mixed EC))

Scheme 1 shows the synthesis of polyetherimide dianhydride (PEI-DA) and PEI-SAA-P (mixed poly).

PEI-SAA-P (mixed poly) was prepared using a mixed endcapping method described as follows. BPADA (17.451 g, 33.528 mmol), mPD (3.444 g, 30.85 mmol), and oDCB (80 mL) were added to a three-neck round-bottom flask equipped with a mechanical stirrer, a nitrogen inlet, and a Dean-Stark trap. The resulting slurry was heated at 180° C. for 12 h under constant stirring, and cooled to below 100° C. Subsequently, SAA-Li (0.300 g, 1.67 mmol), [Ph$_3$P(C$_6$H$_4$-4-NH$_2$)]Br (0.728 g, 1.67 mmol), and NMP (20 mL) were added to the round-bottom flask. The slurry was heated at 180° C. for 6 h under constant stirring, and then at 300° C. for 0.5 h without stirring. The reaction was fully conducted under a constant flow of N$_2$. After the reaction, the product was dissolved in DMF and precipitated into methanol. The precipitate (PEI-SAA-P (mixed poly) without LiBr) was filtered, washed with methanol, and dried in vacuo at 180° C.

Example 3: XPS

XPS was used to confirm the levels of phosphorous and bromine in PEI-SAA-P (mixed poly) and PEI-SAA-P (mixed EC). The XPS spectrum for PEI-PhPPh$_3$Br has P 2p and Br 3d peaks at binding energies of 133.0 and 67.0 eV, respectively. Both PEI-SAA-P (mixed poly) and PEI-SAA-P (mixed EC) each had a P 2p peak with binding energies of about 133 eV. Neither PEI-SAA-P (mixed poly) nor PEI-SAA-P (mixed EC) demonstrated a Br 3d peak at a binding energy of about 67 eV, thus confirming formation of the ionomeric oligomers.

Example 4: Thermal Properties

The thermal degradation behaviour of PEI-SAA-Li, PEI-PhPPh$_3$Br, PEI-SAA-P (mixed poly), and PEI-SAA-P (mixed EC) were determined by TGA. The results are shown in FIG. 1. At 400 to 500° C., the thermal stability was highest for PEI-SAA-P (mixed EC), which was similar to that for PEI-SAA-Li. The thermal stability of PEI-SAA-P (mixed EC) was slightly lower, while PEI-PhPPh$_3$Br had the lowest thermal stability. At temperatures greater than 500° C., the thermal stabilities were ranked as follows: PEI-SAA-P (mixed EC)≈PEI-SAA-P (mixed poly)>PEI-PhPPh$_3$Br>PEI-SAA-Li.

Table 2 summarizes the glass transition (T$_g$) temperatures for PEI-SAA-Li, PEI-PhPPh$_3$Br, PEI-SAA-P (mixed poly), and PEI-SAA-P (mixed EC). PEI-SAA-P (mixed EC) had the same T$_g$ as PEI-SAA-P (mixed poly), which indicated that both "mixed poly" and "mixed EC" approaches could effectively generate the same PEI ionomer blends.

TABLE 2

| Sample | T$_g$ (° C.) |
|---|---|
| 12k-PEI-SAA-Li | 217 |
| 12k-PEI-PhPPh$_3$Br | 223 |
| 12k-PEI-SAA-P(Ph$_3$)-PEI (mixed poly) | 221 |
| 12k-PEI-SAA-P(Ph$_3$)-PEI (mixed EC) | 221 |

Example 5: Char Yield

Table 3 shows the char yields for PEI-1, PEI-2, 12k-PEI-PhPPh$_3$Br, 12k-PEI-SAA-P(Ph$_3$)-PEI (mixed poly), and 12k-PEI-SAA-P(Ph$_3$)-PEI (mixed EC) as obtained at 980° C.

TABLE 3

| Sample | Char yield (%) |
|---|---|
| PEI-PhPPh$_3$Br | 59 |
| PEI-SAA-Li | 51 |
| PEI-SAA-P (mixed poly) | 58 |
| PEI-SAA-P (mixed EC) | 56 |
| PEI-1 | 51 |
| PEI-2 | 50 |

PEI-SAA-P (mixed EC) achieved a char yield of 56%, which is nearly the average of the char yields of PEI-PhPPh$_3$Br (59%) and PEI-SAA-Li (51%). PEI-SAA-P (mixed poly) achieved a char yield of 58%, which is slightly higher than PEI-SAA-P (mixed EC). Both ionomers achieved char yields that exceeded PEI-1 and PEI-2, which demonstrated that the ionomers have improved flame retardancy without the use of bromine.

Example 6: Tensile Properties

Melt pressed samples of PEI-1, PEI-2, and 12k-PEI-SAA-P(Ph$_3$)-PEI (mixed EC) provided free-standing films for tensile testing. Table 4 shows the tensile properties of the oligomers.

TABLE 4

| Property | Units | PEI PhPPh$_3$Br | PEI-1 | PEI-2 | PEI-SAA-P (mixed poly) | PEI-SAA-P (mixed EC) |
|---|---|---|---|---|---|---|
| Tensile strength | MPa | 110 | 113 | 109 | 108 | 111 |
| Yield strain | % | 5.4 | 5.4 | 5.3 | 5.0 | 5.4 |
| Young's modulus | GPa | 3.18 | 3.19 | 3.27 | 3.24 | 3.29 |

As shown in Table 3, PEI-SAA-P (mixed poly) and PEI-SAA-P (mixed EC) retained high tensile strength and Young's modulus compared to PEI-PhPPh$_3$Br. The tensile strengths and Young's moduli of PEI-SAA-P (mixed poly) and PEI-SAA-P (mixed EC) were comparable to those of PEI-1 and PEI-2. The yield strain of PEI-SAA-P (mixed EC) was also comparable to that of PEI-1 and PEI-2. The results show that 12k-PEI-SAA-P(Ph$_3$)-PEI advantageously has tensile properties greater than or similar to PEI oligomers having greater M$_n$.

Example 7: Rheological Properties

Figure 2:
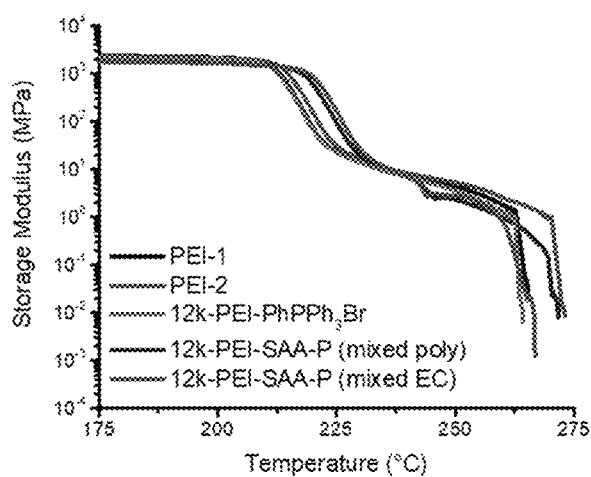
FIG. 2 is a graph of storage modulus (megapascals, MPa) versus temperature (° C.) showing results showing dynamic mechanical analysis (DMA) for PEI oligomers according to an aspect of the disclosure.

FIG. 2 shows the results of dynamic mechanical analysis (DMA), which revealed the storage modulus response over temperature for PEI-1, PEI-2, PEI-PhPPh$_3$Br, PEI-SAA-P (mixed poly), and PEI-SAA-P (mixed EC). PEI-SAA-P (mixed poly) and PEI-SAA-P (mixed EC) both exhibited a "dip" at a temperature around 245° C., which is characteristic of sulfonated PEIs.

Figure 3:
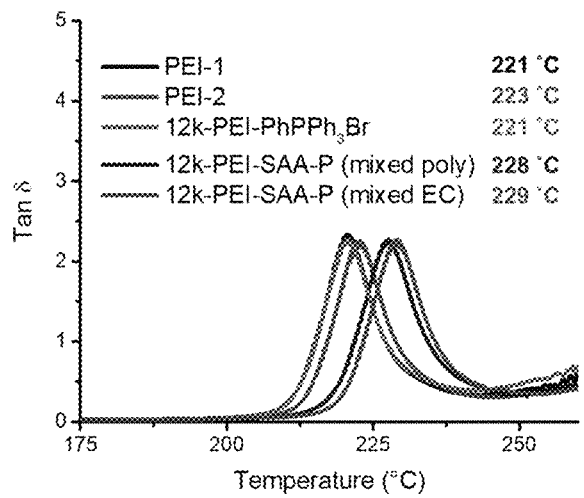
FIG. 3 is a graph of tan δ versus temperature (° C.) for PEI oligomers according to an aspect of the disclosure.

FIG. 3 shows the T$_g$ values determined by DMA for PEI-1, PEI-2, 12k-PEI-PhPPh$_3$Br, PEI-SAA-P (mixed poly), and PEI-SAA-P (mixed EC). The higher T$_g$ of PEI-SAA-P (mixed poly) and PEI-SAA-P (mixed EC) suggested stronger interchain interactions compared to PEI-1, PEI-2, and PEI-PhPPh$_3$Br.

Figure 4:
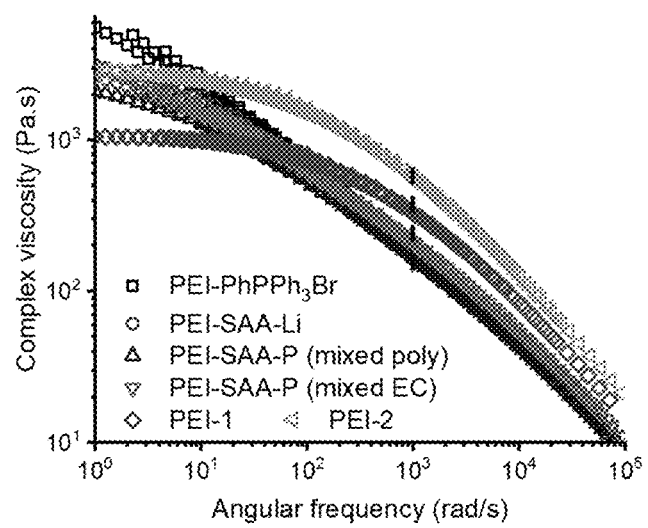
FIG. 4 is a graph of complex viscosity (pascal seconds, Pa·s) versus angular frequency (radians per second, rad/s) according to an aspect of the disclosure.

FIG. 4 shows the changes in complex viscosity based on angular frequency for PEI-1, PEI-2, PEI-PhPPh$_3$Br, PEI-SAA-Li, PEI-SAA-P (mixed poly), and PEI-SAA-P (mixed EC). Compared to PEI-PhPPh$_3$Br and PEI-SAA-Li, both PEI-SAA-P (mixed poly) and PEI-SAA-P (mixed EC) retained low viscosity at angular frequencies of 100 rad/s and above, indicating that the removal of Li$^+$ and Br$^-$ would not jeopardize the flow properties of the PEIs. Compared to PEI-2 with an M$_n$ of about 24.5 kDa, both PEI-SAA-P (mixed poly) and PEI-SAA-P (mixed EC) exhibited stronger shear thinning at high angular frequencies. The complex viscosities of both PEI-SAA-P (mixed poly) and PEI-SAA-P (mixed EC) decreased by about 93%, while those of PEI-1 and PEI-2 decreased by 68% and 80%, respectively, when the angular frequency increased from 1 to 1,000 rad/s. The viscosity of PEI-SAA-P (mixed poly) was slightly lower than that of PEI-SAA-P (mixed EC).

This disclosure is further illustrated by the following non-limiting aspects.

Aspect 1. A polyimide oligomer of formula (1a), (1b), a copolymer thereof, or a combination thereof, wherein each G$^1$ is independently the same or different, and is a cation group; each G$^2$ is independently the same or different, and is an anion group; each D is independently the same or different, and is a single bond or C$_{1-20}$ divalent hydrocarbon group; each V is independently the same or different, and is a tetravalent C$_{4-40}$ hydrocarbon group; each R is independently the same or different, and is a C$_{1-20}$ divalent hydrocarbon group; each n is independently the same or different, and is 1 to 1,000, preferably 2 to 500, more preferably 3 to 100, provided that the total of all values of n is greater than 4, or greater than 10, or greater than 20, or greater than 50, or greater than 100, or greater than 250; and t is 2 to 1000, more preferably 3 to 500, even more preferably 4 to 250.

Aspect 2. The polyimide oligomer of aspect 1, wherein each G$^1$ is independently ammonium, phosphonium, sulfonium, imidazolium, guanidinium, or pyridinium; and each G$^2$ is independently carboxylate, sulfate, sulfonate, phosphate, phosphinate, or phosphonate.

Aspect 3. The polyimide oligomer of aspect 1 or 2, wherein each D is independently substituted or unsubstituted C$_{1-20}$ alkylene, substituted or unsubstituted C$_{3-8}$ cycloalkylene, substituted or unsubstituted C$_{6-20}$ arylene, or substituted or unsubstituted C$_{3-12}$ heteroarylene, preferably C$_{1-20}$ alkylene or C$_{6-20}$ arylene, more preferably C$_{1-6}$ alkylene or C$_{6-12}$ arylene; G$^1$ is —N(R$^a$)(R$^b$)(R$^c$)— or —P(R$^a$)(R$^b$)(R$^c$)—; and G$^2$ is —C(O)O—, —S(O)$_2$O—, —OP(O)(OR$^d$)O—, —P(P)(R$^c$)O—, —P(O)(OR$^f$)O—, or —OP(O)(R$^g$)O— wherein R$^a$, R$^b$, R$^c$, R$^d$, R$^e$, R$^f$, and R$^g$ are each independently hydrogen, substituted or unsubstituted C$_{1-8}$ alkyl, or substituted or unsubstituted C$_{6-12}$ aryl.

Aspect 4. The polyimide oligomer of any one or more of the preceding aspects, wherein V is a group of the formulas

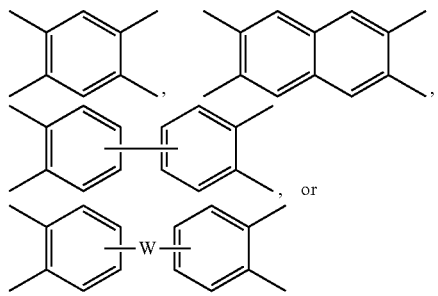

, or wherein W is —O—, —S—, —C(O)—, —SO$_2$—, —SO—, —P(R$^h$)(=O)— wherein R$^h$ is a C$_{1-8}$ alkyl or C$_{6-12}$ aryl, —C$_y$H$_y$— wherein y is an integer from 1 to 5 or a halogenated derivative thereof, or a group of the formula —O—Z—O— wherein Z is an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded.

Aspect 5. The polyimide oligomer of any one or more of the preceding aspects, wherein structural units of formula (2) are divalent groups of formula (2a) wherein each Z is independently an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded.

Aspect 6. The polyimide oligomer of aspect 5, wherein Z is a divalent group of formula (3a) wherein J is —O—, —S—, —C(O)—, —SO$_2$—, —SO—, or —C$_y$H$_{2y}$— wherein y is an integer from 1 to 5 or a halogenated derivative thereof; preferably wherein J is isopropylidene and R is m-phenylene.

Aspect 6a. The polyimide oligomer of any one or more of the preceding aspects, wherein G$^1$ is —P(Ph)$_3$-, G$^2$ is —S(O)$_2$ O—, and D is m-phenylene.

Aspect 7. A method for the manufacture of the polyimide oligomer of any one or more of the preceding aspects, the method comprising: reacting a diamine of formula (4) with a dianhydride of formula (5) in a solvent and under conditions effective to provide an anhydride-capped oligomer; and reacting the anhydride-capped oligomer with amino compounds of formulas (6a) and (6b) under conditions effective to provide the polyimide oligomer of formula (1a) or under conditions effective to provide the polyimide oligomer of formula (1b), wherein A is an anion, preferably Cl$^-$, Br$^-$, I$^-$, a substituted or unsubstituted (C$_{1\text{-}24}$ hydrocarbyl)carboxylate, HCO$_3^-$, CO$_3^{2-}$, CH$_3$SO$_4^-$, HSO$_4^-$, SO$_4^{2-}$, H$_2$PO$_4^-$, HPO$_4^{2-}$, PO$_4^{3-}$, NO$_3^-$, p-toluenesulfonate, bis(trifluoromethanesulfonyl)imide, or a combination thereof, more preferably Cl$^-$, Br$^-$, or CO$_3^{2-}$, M is a cation, preferably Li$^+$, Na$^+$, K$^+$, Mg$^{2+}$, Ca$^{2+}$, Sr$^{2+}$, Zn$^{2+}$, ammonium, phosphonium, imidazolium, guanidinium, pyridinium, or a combination thereof, more preferably Li$^+$, Na$^+$, or K$^+$, and R, V, D, G$^1$, and G$^2$ are as defined in any one or more the preceding aspects.

Aspect 8. A method for the manufacture of the polyimide oligomer of any one or more of aspects 1 to 6, wherein the polyimide oligomer is a polyetherimide oligomer, the method comprising: reacting a diamine of formula (4) with an anhydride of formula (7) wherein X is a nitro group or halogen, to provide intermediate bis(phthalimide) of formula (8) reacting the bis(phthalimide) with an alkali metal salt of a dihydroxy aromatic compound of formula (9) wherein AM is an alkali metal, to provide an anhydride-capped oligomer; and reacting the anhydride-capped oligomer with amino compounds of formulas (6a) and (6b) under conditions effective to provide the polyimide oligomer of formula (1a) or under conditions effective to provide the polyimide oligomer of formula (1b), wherein A, M, R, V, D, G$^1$, and G$^2$ are as defined in any one or more preceding aspects.

Aspect 8a. The method of any one or more of the preceding aspects, wherein 0.1 to 20 mole percent of the diamine (4) is replaced by a branching polyamine of formula (4a), wherein G is a group having a valence of t, each Q is independently the same or different, and is a substituted or unsubstituted divalent C$_{1\text{-}60}$ hydrocarbon group, —O—, —C(O)O—, —OC(O)O—, —S—, —S(O$_3$)—, —OS(O)$_3$—, or —OP(O)$_3$—, each M is independently the same or different, and is a substituted or unsubstituted divalent C$_{1\text{-}60}$ hydrocarbon group, —O—, —C(O)—, —OC(O)—, —OC(O)O—, —NHC(O), —(O)CNH—, —S—, —S(O)—, or —S(O)$_2$—, each D is independently the same or different, and is a single bond or C$_{1\text{-}20}$ divalent hydrocarbon group, q is 0 or 1, m is 0 or 1, d is 0 or 1, p is 1 or 2, and t is 3 to 6.

Aspect 8b. The method of any one or more of the preceding aspects, wherein the conditions effective to provide the polyimide oligomer of formula (1a) and/or of formula (1b) comprise adding an organic solvent, water, or a combination thereof, to provide the polyimide oligomer of formula (1a) and/or of formula (1b).

Aspect 9. A polyimide composition comprising: a first polyimide of formula (10), a precursor thereof, or a combination thereof; a second polyimide of formula (11), a precursor thereof, or a combination thereof; and optionally a third polyimide of formula (12), a precursor thereof, or a combination thereof, wherein G$^1$, G$^2$, D, V, R, and n are as defined herein.

Aspect 10. The polyimide composition of aspect 9, wherein the first polyimide is of formula (10a); the second polyimide is of formula (11a); and the optional third polyimide is of formula (12a).

Aspect 11. A method for the manufacture of the polyimide composition of aspect 9 or 10, the method comprising: preparing a first polyimide precursor by reacting a first diamine of formula (4) with a first dianhydride of formula (5) under conditions effective to provide a first anhydride-capped oligomer; and reacting the first anhydride-capped oligomer with an amino compound of formula (6a) under conditions effective to provide the first polyimide precursor; preparing a second polyimide precursor by reacting a second diamine of formula (4) with a second dianhydride of formula (5) under conditions effective to provide a second anhydride-capped oligomer; and reacting the second anhydride-capped oligomer with an amino compound of formula (6b) under conditions effective to provide the second polyimide precursor; and combining the first polyimide precursor and the second polyimide precursor under conditions effective to provide the polyimide composition.

Aspect 12. The polyimide oligomer of any one or more of aspects 1 to 6, having one or more of the following properties: a $T_g$ of greater than 160° C., preferably 160 to 395° C., more preferably 180 to 280° C., even more preferably 200 to 250° C., as determined by differential scanning calorimetry; or a thermal decomposition temperature of greater than 450° C., preferably 480 to 600° C., more preferably 500 to 600° C., as determined at a 5% weight loss by thermogravimetric analysis; or a tensile yield strength of greater than 70 MPa, or 70 to 160 MPa, preferably 80 to 140 MPa, more preferably 90 to 130 MPa, as determined by ASTM D638; or a tensile break strength of greater than 70 MPa, or 70 to 160 MPa, preferably 80 to 140 MPa, more preferably 90 to 130 MPa, as determined by ASTM D638.

Aspect 13. A polymer composition comprising: the polyimide oligomer or the polyimide composition of any one or more of the preceding aspects; and a second polymer that is different from the polyimide oligomer.

Aspect 14. An article comprising the polyimide oligomer of any one or more of 1 to 6, the polyimide composition of any one or more of aspects 9 or 10, or the polymer composition of aspect 13.

Aspect 15. The article of aspect 14, wherein the article is a film, a foam, a membrane, a conducting part, a fiber, a lens, a varnish, or a composite; preferably wherein the article is an open cell foam, a closed cell foam, a nano-foam, a battery separator, an ion exchange membrane, tubing, a capillary, a coating, or a scratch resistant part.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The singular forms "a," "an," and "the" include plural referents unless the context clearly dictates otherwise. "Or" means "and/or" unless clearly indicated otherwise by context. The endpoints of all ranges directed to the same component or property are inclusive and independently combinable. Disclosure of a narrower range or more specific group in addition to a broader range is not a disclaimer of the broader range or larger group. "Combination thereof" as used herein is open-ended and means that a combination comprises one or more of the listed items, optionally with one or more like items not listed.

Unless defined otherwise, technical and scientific terms used herein have the same meaning as is commonly understood by one of skill in the art to which this disclosure belongs. A "combination" is inclusive of blends, mixtures, alloys, reaction products, and the like. "Hydrocarbyl" and "hydrocarbon" refer broadly to a group comprising carbon and hydrogen, optionally with 1 to 3 heteroatoms, for example, oxygen, nitrogen, halogen, silicon, sulfur, or a combination thereof; "alkyl" means a straight or branched chain, saturated monovalent hydrocarbon group; "alkylene" means a straight or branched chain, saturated, divalent hydrocarbon group; "alkylidene" means a straight or branched chain, saturated divalent hydrocarbon group, with both valences on a single common carbon atom; "alkenyl" means a straight or branched chain monovalent hydrocarbon group having at least two carbons joined by a carbon-carbon double bond; "cycloalkyl" means a non-aromatic monovalent monocyclic or multicyclic hydrocarbon group having at least three carbon atoms, "cycloalkenyl" means a non-aromatic cyclic divalent hydrocarbon group having at least three carbon atoms, with at least one degree of unsaturation; "aryl" and "arylene" mean a monovalent group and divalent group respectively containing at least one aromatic ring and optionally a nonaromatic ring, and having only carbon in the ring or rings; "alkylaryl" means an aryl group that has been substituted with an alkyl group; "arylalkyl" means an alkyl group that has been substituted with an aryl group; "heteroaryl" and "heteroarylene" mean a monovalent group and divalent aromatic group respectively wherein at least one carbon in a ring is replaced by a heteroatom (S, O, P, or N); "acyl" means an alkyl group attached through a carbonyl carbon bridge (—C(=O)—); "alkoxy" means an alkyl group attached through an oxygen bridge (—O—); and "aryloxy" means an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. Combinations of substituents or variables are permissible. "Substituted" as used herein means that at least one hydrogen on the designated atom or group is replaced with another group, provided that the designated atom's normal valence is not exceeded. When the substituent is oxo (=O), then two hydrogens on the atom are replaced. Exemplary groups that can be present on a "substituted" position include, but are not limited to, cyano; hydroxyl; nitro; alkanoyl (e.g., $C_{2-6}$ alkanoyl group such as acyl); carboxamido; $C_{1-6}$ or $C_{1-3}$ alkyl, cycloalkyl, alkenyl, and alkynyl; $C_{1-6}$ or $C_{1-3}$ alkoxy; $C_{6-10}$ aryloxy; $C_{1-6}$ alkylthio; $C_{1-6}$ or $C_{1-3}$ alkylsulfinyl; $C_{1-6}$ or $C_{1-3}$ alkylsulfonyl; amino di($C_{1-6}$ or $C_{1-3}$)alkyl; $C_{6-12}$ aryl; $C_{7-19}$ arylalkyl; or $C_{7-19}$ arylalkoxy. When a group is substituted, the indicated number of carbon atoms includes the substituent.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A polyimide oligomer of formula (1a), (1b), a copolymer thereof, or a combination thereof,

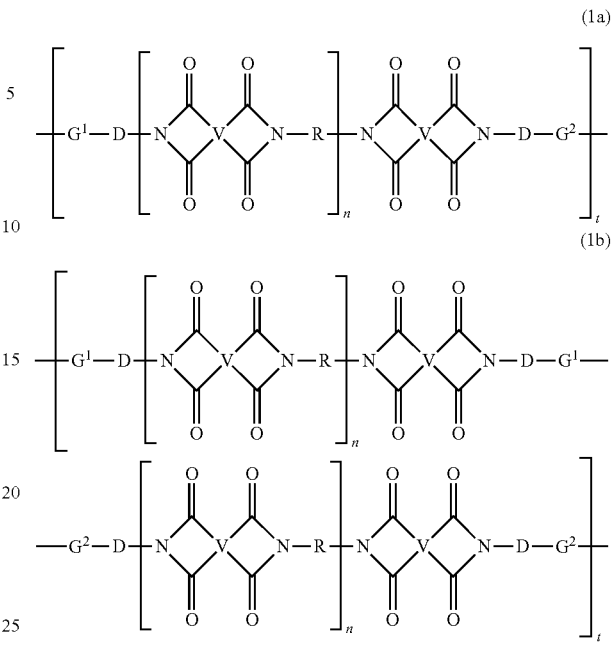

wherein
each $G^1$ is independently the same or different, and is a cation group;
each $G^2$ is independently the same or different, and is an anion group;
each D is independently the same or different, and is a single bond or $C_{1-20}$ divalent hydrocarbon group;
each V is independently the same or different, and is a tetravalent $C_{4-40}$ hydrocarbon group;
each R is independently the same or different, and is a $C_{1-20}$ divalent hydrocarbon group;
each n is independently the same or different, and is 1 to 1,000, provided that the total of all values of n is greater than 4; and
t is 2 to 1000.

2. The polyimide oligomer of claim 1, wherein
each $G^1$ is independently ammonium, phosphonium, sulfonium, imidazolium, guanidinium, or pyridinium; and
each $G^2$ is independently carboxylate, sulfate, sulfonate, phosphate, phosphinate, or phosphonate.

3. The polyimide oligomer of claim 1, wherein
each D is independently substituted or unsubstituted $C_{1-20}$ alkylene, substituted or unsubstituted $C_{3-8}$ cycloalkylene, substituted or unsubstituted $C_{6-20}$ arylene, or substituted or unsubstituted $C_{3-12}$ heteroarylene;
$G^1$ is —N($R^a$)($R^b$)($R^c$)— or —P($R^a$)($R^b$)($R^c$)—; and
$G^2$ is —C(O)O—, —S(O)$_2$O—, —OP(O)(O$R^d$)O—, —P(O)($R^e$)O—, —P(O)(O$R^f$)O—, or —OP(O)($R^g$)O— wherein $R^a$, $R^b$, $R^c$, $R^d$, $R^e$, $R^f$, and $R^g$ are each independently hydrogen, substituted or unsubstituted $C_{1-8}$ alkyl, or substituted or unsubstituted $C_{6-12}$ aryl.

4. The polyimide oligomer of claim 1, wherein V is a group of the formulas

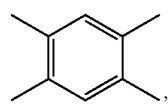, 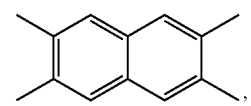,

-continued

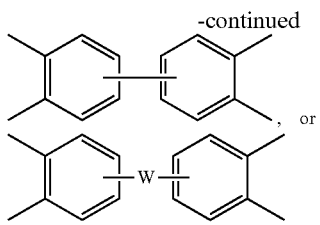

, or

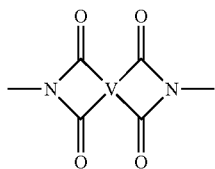

wherein W is —O—, —S—, —C(O)—, —SO$_2$—, —SO—, —P(R$^h$)(=O)— wherein R$^h$ is a C$_{1-8}$ alkyl or C$_{6-12}$ aryl, —C$_y$H$_{2y}$— wherein y is an integer from 1 to 5 or a halogenated derivative thereof, or a group of the formula —O—Z—O— wherein Z is an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded.

5. The polyimide oligomer of claim 1, wherein structural units of formula (2)

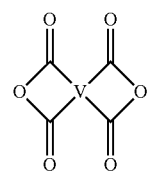

(2)

are divalent groups of formula (2a)

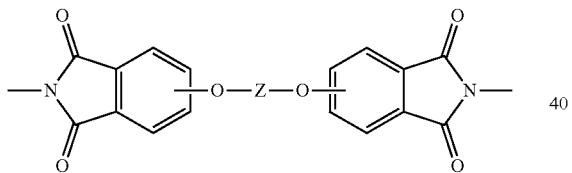

(2a)

wherein each Z is independently an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded.

6. The polyimide oligomer of claim 5, wherein Z is a divalent group of formula (3a)

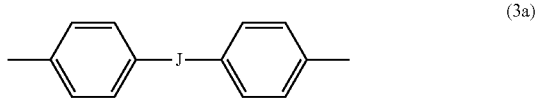

(3a)

wherein J is —O—, —S—, —C(O)—, —SO$_2$—, —SO—, or —C$_y$H$_{2y}$— wherein y is an integer from 1 to 5 or a halogenated derivative thereof.

7. The polyimide oligomer of claim 6, wherein J is isopropylidene and R is m-phenylene.

8. The polyimide oligomer of claim 1, wherein G$^1$ is —P(Ph)$_3$-, G$^2$ is —S(O)$_2$O—, and D is meta-phenylene.

9. The polyimide oligomer of claim 1, having one or more of the following properties:

a T$_g$ of greater than 160° C., as determined by differential scanning calorimetry; or
a thermal decomposition temperature of greater than 450° C., as determined at a 5% weight loss by thermogravimetric analysis; or
a tensile yield strength of greater than 70 megapascals, as determined by ASTM D638; or
a tensile break strength of greater than 70 megapascals, as determined by ASTM D638.

10. A method for the manufacture of the polyimide oligomer of claim 1, the method comprising:

reacting
a diamine of formula (4)

$$H_2N-R-NH_2 \quad (4)$$

with a dianhydride of formula (5)

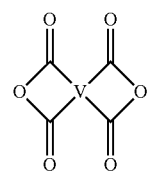

(5)

in a solvent and under conditions effective to provide an anhydride-capped oligomer; and
reacting the anhydride-capped oligomer with amino compounds of formulas (6a) and (6b)

$$H_2N\text{-}D\text{-}G^1\text{-}A \quad (6a)$$

$$H_2N\text{-}D\text{-}G^2\text{-}M' \quad (6b)$$

under conditions effective to provide the polyimide oligomer of formula (1a) or under conditions effective to provide the polyimide oligomer of formula (1b), wherein
A is an anion,
M' is a cation, and
R, V, D, G, and G$^2$ are as defined in claim 1.

11. The method of claim 10, wherein
A is Cl$^-$, Br$^-$, I$^-$, a substituted or unsubstituted (C$_{1-24}$ hydrocarbyl)carboxylate, HCO$_3^-$, CO$_3^{2-}$, CH$_3$SO$_4^-$, HSO$_4^-$, SO$_4^{2-}$, H$_2$PO$_4^-$, HPO$_4^{2-}$, PO$_4^{3-}$, NO$_3^-$, p-toluenesulfonate, bis(trifluoromethanesulfonyl)imide, or a combination thereof; and
M' is Li$^+$, Na$^+$, K$^+$, Mg$^{2+}$, Ca$^{2+}$, Sr$^{2+}$, Zn$^{2+}$, ammonium, phosphonium, imidazolium, guanidinium, pyridinium, or a combination thereof.

12. The method of claim 10, wherein 0.1 to 20 mole percent of the diamine (4) is replaced by a branching polyamine of formula (4a)

$$G\text{-}\!\!\left[Q_q\text{-}M_m\text{-}D_d\text{-}\!\!\left[NH_2\right]_p\right]_t \quad (4a)$$

wherein
G is a group having a valence of t,
each Q is independently the same or different, and is a substituted or unsubstituted divalent C$_{1-60}$ hydrocarbon group, —O—, —C(O)O—, —OC(O)O—, —S—, —S(O$_3$)—, —OS(O)$_3$—, or —OP(O)$_3$—,
each M is independently the same or different, and is a substituted or unsubstituted divalent C$_{1-60}$ hydrocarbon group, —O—, —C(O)—, —OC(O)—, —OC(O)O—, —NHC(O), —(O)CNH—, —S—, —S(O)—, or —S(O)$_2$—, each D is independently the same or different, and is a single bond or C$_{1-20}$ divalent hydrocarbon group, q is 0 or 1, m is 0 or 1, d is 0 or 1, p is 1 or 2, and t is 3 to 6.

13. The method of claim 10, wherein the conditions effective to provide the polyimide oligomer of formula (1a) and/or of formula (1b) comprise adding an organic solvent, water, or a combination thereof, to provide the polyimide oligomer of formula (1a) and/or of formula (1b).

14. A polymer composition comprising:
the polyimide oligomer of claim 1; and
a second polymer that is different from the polyimide oligomer.

15. An article comprising the polyimide oligomer of claim 1.

16. The article of claim 15, wherein the article is a film, a foam, a membrane, a conducting part, a fiber, a lens, a varnish, or a composite.

17. The article of claim 15, wherein the article is an open cell foam, a closed cell foam, a nano-foam, a battery separator, an ion exchange membrane, tubing, a capillary, a coating, or a scratch resistant part.

* * * * *